United States Patent [19]

Wunsch et al.

[11] 4,264,142
[45] Apr. 28, 1981

[54] SETTING OR ADJUSTING MEANS FOR REARVIEW MIRRORS OF MOTOR VEHICLES

[76] Inventors: Erich Wunsch; Udo Wunsch; Eckart Wunsch, all of Im Hofrain 12, 7141 Schwieberdingen, Baden-Württemberg, Fed. Rep. of Germany

[21] Appl. No.: 32,038

[22] Filed: Apr. 23, 1979

Related U.S. Application Data

[62] Division of Ser. No. 725,667, Sep. 22, 1976, Pat. No. 4,159,866.

[30] Foreign Application Priority Data

Sep. 30, 1975 [DE] Fed. Rep. of Germany ....... 2543512
Oct. 15, 1975 [DE] Fed. Rep. of Germany ....... 2546091
Dec. 23, 1975 [DE] Fed. Rep. of Germany ....... 2558457
Mar. 4, 1976 [DE] Fed. Rep. of Germany ....... 2608919
Aug. 25, 1976 [DE] Fed. Rep. of Germany ....... 2638143

[51] Int. Cl.³ .............................................. G02B 5/08
[52] U.S. Cl. .................................................. 350/289
[58] Field of Search .............................. 350/279–282, 350/289

[56] References Cited

U.S. PATENT DOCUMENTS

| | | | |
|---|---|---|---|
| 3,459,470 | 8/1969 | Hahn | 350/289 |
| 3,475,081 | 10/1969 | Russell | 350/279 |
| 3,664,729 | 5/1972 | Moore | 350/283 X |

*Primary Examiner*—F. L. Evans
*Attorney, Agent, or Firm*—Martin A. Farber

[57] ABSTRACT

A setting or adjusting device for rearview mirrors with a mirror plate secured to an arm which is pivotal both about a substantially vertical axis and about a substantially horizontal axis, yet is mounted non-rotatably in an axis perpendicular to the two axes, on a mirror holder. An adjusting unit engages the arm acting against a return spring, and comprises two tongs-like members rotatably mounted on the mirror holder about a common axis. The tongs-like members have first legs which accommodate the arm between them, and second legs which cooperate respectively with a controllable adjusting drive such a manner that a pivotal movement of the first legs respectively takes place about the common axis so that a displacement of the arm which is guided between the two first legs occurs which is transmitted in the form of a tilting movement about the horizontal and vertical axes respectively to the mirror plate.

29 Claims, 9 Drawing Figures

SETTING OR ADJUSTING MEANS FOR REARVIEW MIRRORS OF MOTOR VEHICLES

This application is a division of Ser. No. 725,667 filed Sept. 22, 1976, now U.S. Pat. No. 4,159,866.

The invention relates to a setting or adjusting means for rearview mirrors of motor vehicles or the like with the aid of which the rearward field of view of the driver can be adapted also when the vehicle is travelling both to his sitting and driving position and to the particular traffic situation.

To solve this problem a great variety of special forms of rearview mirrors has already been proposed but none of them has so far been completely satisfactory. Thus, a rearview mirror is known which has two mirror plates in which in addition to the normal mirror plate, which covers the rearward road area, a second mirror plate is provided which is angled with respect to the first along a substantially vertical line and covers an area lying more to the side of the vehicle so that with this mirror assembly a total of two images results. These two images frequently irritate the driver because simultaneous consideration and correct interpretation of the two images requires special concentration and, in particular, require practice. Experience has shown that many users of such divided mirrors require a long familiarization time before they can use them properly and in some cases never are able to do so. Moreover, the blind angle is still not completely eliminated because motor or pedestrian traffic, for example, directly adjacent a vehicle is still not visible and this is a frequent cause of serious accidents.

The problem underlying the present invention is therefore to construct a rearview mirror so that it provides adequate viewability not only of the rearward road area but also, preferably simultaneously, of the lateral area adjacent the vehicle up to the level of the driver and of the area beneath the lateral field of view and thus substantially eliminates a blind angle. According to one feature of the invention an independent pivoting of the mirror plate (111) into a laterally or vertically tilted position is possible, which is achieved in that the mirror plate is mounted on an arm (120) which is pivotal both about a substantially vertical axis (117) and about a substantially horizontal axis (118) but is mounted non-rotatably on a mirror support in the axis perpendicular to said two (117, 118) on a mirror support (112). An adjusting means (115) engages the arm (120) and acts against a return spring (116) and which includes two tongs-like members (127, 129; 128, 130) formed as tongs which are mounted on a common axis rotatably on the mirror support (112), one of the legs (127, 128) of which accommodate between them the arm (120) while the other legs (129, 130) of which respectively cooperate with an independently controllable adjusting drive in such a manner that a pivotal movement of the leg (127, 128) receiving the arm about the common axis (125) results so that a displacement of the arm guided between the two legs (127, 128) is effected, which is transmitted in the form of a tilting movement about the vertical (117) or horizontal (118) axes to the mirror plate. As adjusting drive for producing the adjusting forces for pivoting the tongs-like lever arms mechanical or electrically operating means may be provided. In the simplest case a pull cable or Bowden cable is secured to each leg of the lever members and operable from the interior of the vehicle. In another embodiment the adjusting forces are produced by a cam disc which acts on the respective leg of the associated lever member and which is driven by a gear motor which is controllable from the interior of the vehicle.

Still further according to the invention the adjusting means (115) comprises at least one adjusting drive, for example an electrical, preferably reversible gear motor (133) which engages on the tongs arm (129, 130) for the pivotal actuation thereof, and preferably the driven shaft (140) of the gear motor (133) drives an eccentric cam (138, 139) preferably contructed as a cam disc which engages the tongs arm (130, 129), preferably in contact with the narrow face thereof, preferably with that which is remote or facing the other tongs arm, and preferably the cam disc (138 or 139) is disposed outside or inside the region included by the tongs arms (129, 130).

Further another feature of the invention is that the mirror plate mounting (112) with the arm (120), the return spring (116), the tongs-like adjusting member (124) and the gear motor (133) with eccentric cams (138, 139) are disposed within the mirror housing (113).

Another advantage according to the invention is that for each tongs arm (129, 130) a separate associated electrical gear motor with eccentric cam (139, 138) driven thereby is provided.

Still further according to the invention for both tongs arms (130, 129) a single common gear motor (133) is arranged whose output acts on each eccentric cam (138, 139) associated with a tongs arm (130, 129), and preferably that the two eccentric cams, in particular cam discs (138, 139), are arranged coaxially to each other on the driven or output shaft (140) of the gear motor (133) within the region included by the tongs arms (129, 130), and preferably that the cam track (142) of the second cam disc (139) in the first output direction (arrow 143) and the cam track (141) of the first cam disc (138) in the opposite second output direction of rotation (arrow 144) of the output shaft (140) increase radially substantially continuously up to the eccentricity maximum.

According to a feature of the invention, the two cam discs (138, 139) are each coupled via a positive or non-positive free wheel (145, 146) to the common output shaft (140) of the gear motor, the free-wheels (145, 146) being so designed that the first free-wheel (145) associated with the first cam disc (138) transmits a torque in the first output direction of rotation (arrow 143) of the output shaft (140) and in the opposite second output direction of rotation (arrow 144) rotates freely, whereas the second free-wheel (146) associated with the second cam disc (139) rotates freely in the first output direction of rotation (arrow 143) of the output shaft (140) and transmits a torque in the opposite second output direction of rotation (arrow 144), and preferably that the free-wheels (145, 146) of the two cam discs (138, 139) are constructionally similar and only disposed in opposite arrangement on the output shaft (140) and preferably constructed as non-positive spring or roller free-wheels.

Further according to a feature of the invention, the first and second cam disc (138, 139) each comprise a positive or non-positive return stop (149, 150) by means of which each cam disc (138 or 139) is blockable against a free entrained rotation in the same direction as the torque transmitting output direction of rotation (arrow 143 or 144) of the other cam disc (138, 139), the first cam disc (138) being blockable by means of its return stop against a rotary movement (arrow 144) oppositely to the first torque transmitting output direction of rotation (arrow 143) and the second cam disc (139) being blockable by means of its return stop (150) against a rotary movement in the same direction of rotation as the first output direction of rotation (arrow 143).

Another advantage according to the invention is that the arm (120) engages, via a ball joint (119), by means of which arm it is pivotally mounted about the spatially vertical and/or horizontal axis (117, 118) with respect to the mirror housing (113) or mirror holder (112), on the mirror plate (111), or that the arrangement is such that the mirror plate (111) is secured to a support (171) which in turn is pivotally mounted within a fork (172) about a spatially horizontal or vertical axis (117), that the fork (172) is pivotally mounted with respect to the mirror housing or mirror holder (112) about the spatially vertical or horizontal axes (118) and that the arm (120) is secured to the support (171) of the mirror plate (111), and preferably that the tongs-like adjusting member (124) engages the arm (120) on the side of the ball joint (119) or support (171) remote from the mirror plate (111).

Another advantage according to the invention is that the return stop comprises for each cam disc (139) a blocking disc axially adjacent the cam disc and coaxial therewith which is centered on the output shaft (140) and freely rotatable, and at least one blocking roller engaging the periphery of the blocking disc and disposed in a roller holder with inclined face stationary with respect to the output shaft (140), and that the blocking disc is positively coupled by means of a driver to the cam disc (139) and is rotatable, and preferably that either the inclined face of the roller holder extends substantially vertically and the blocking roller is pressed by means of gravity in the direction of the vertically tapering gap formed between the inclined face and the periphery of the blocking roller, or alternatively that the blocking roller is adapted to be pressed by means of a spring into the clamping gap formed between the inclined surface and the periphery of the blocking disc.

Still further according to the invention, the driver is constructed as an axial projection (287), preferably as pin, which engages in a recess, preferably in the form of a radial slot, on the facing axial side of the cam disc (139).

The invention will be explained in detail hereafter with the aid of the examples of embodiment illustrated in the drawings, wherein:

FIG. 5 is an enlarged exploded perspective illustration, partially in section, of the adjusting means with adjusting element, FIGS. 6a and 6b each show an end elevation, partially in section, of each free-wheel with cam disc of the adjusting means, in the direction of the arrow XVa and XVb respectively of FIG. 5.

Figure 1:
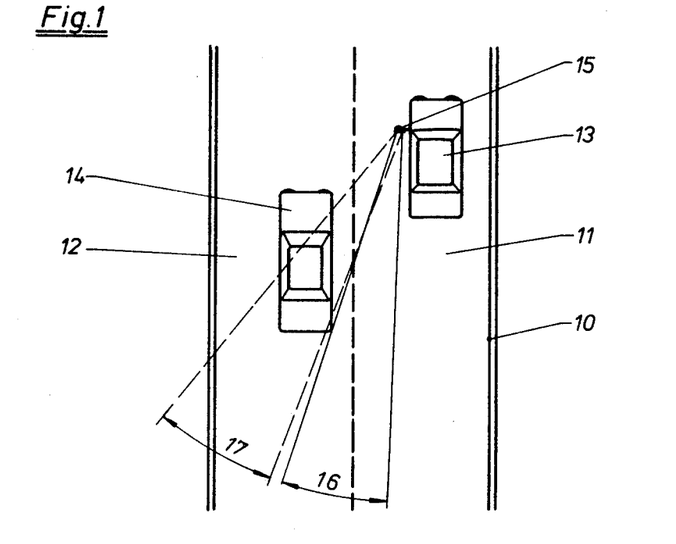
FIG. 1 is a schematic plan view of a road with two vehicles.

FIG. 1 shows a road 10 with a normal lane 11 and an overtaking lane 12 on which a vehicle 13 is being overtaken by a vehicle 14. The exterior rearview mirror 15 of the vehicle 13 is constructed according to the invention. In the rest position of the mirror 15 the driver of the vehicle 13 has the angle of view 16. The vehicle 14 is not visible in the mirror 15 of the vehicle 13. The angle 17 of view shown in dashed line results for the driver of the vehicle 13 when the mirror 15 has been adjusted out of the rest position about a substantially vertical axis to the left outwardly into a laterally tilted position. The vehicle 14 is then in the field of view of the driver and not in the blind angle.

Figure 2:
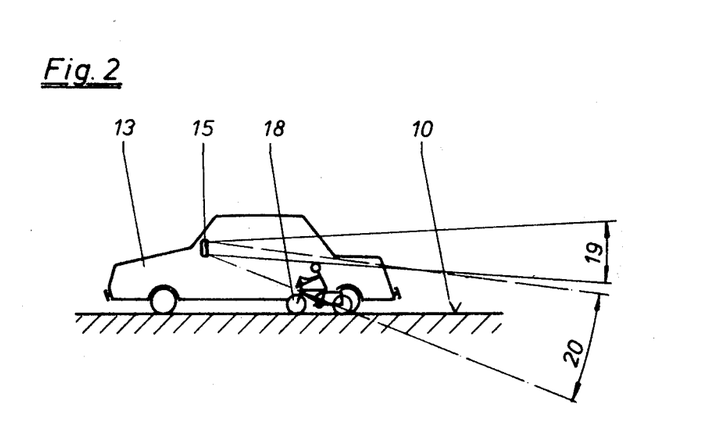
FIG. 2 is a schematic side elevation of the left side of a vehicle and a cyclist.

FIG. 2 shows alongside the vehicle 13, but beneath the lateral angle of view of the driver, a cyclist with bicycle 18. In the rest position of the mirror 15 the vertical angle of view 19 is obtained. The bicycle 18 is not visible for the driver of the vehicle 13. The mirror 15 obviates this blind angle as well. The vertical angle of view 20 results when the mirror is moved out of its rest position about a substantially horizontal axis downwardly into a vertically tilted position. The bicycle 18 is then visible in the mirror 15. Thus, a blind angle may be eliminated by means of the mirror both in the lateral direction and in the vertical direction. These two motions may be superimposed. The vertical tilting results in the vertical angle of view 20 (FIG. 2) and the lateral tilting results in the lateral angle of view 17 (FIG. 1).

In the embodiment of FIGS. 3 to 6, the mirror 110 comprises a mirror plate 111, a mirror holder 112 adapted to be attached to a vehicle; and a housing 113 with a transparent sealing disc 114. For adjustment of the mirror plate 111 about the substantially vertical axis 117 and horizontal axis 118 a remote-controllable adjusting means 115 is provided which acts against a return spring 116. Secured to the mirror plate 111, possibly via a ball joint 121, is a arm 120 with ball 119 which is pivotally mounted in the mounting 112. The return spring 116 is secured to the housing 113 and the arm 120. The center axis of the arm 120 forms a third space axis at right angles to the vertical axis 117 and horizontal axis 118. The ball 119 is secured against rotation about the latter axis by an arresting pin 122 projecting into a narrow guide slot 123 into the ball 119. An adjusting movement of the adjusting means 115 engaging the right end of the arm 120 effects a pivoting of the mirror plate 111 about the axes 117 and/or 118.

The adjusting means 115 comprises a tongs member 124 with a common tongs axis 125 extending in spaced and substantially parallel relationship to the axis of the arm 120. The adjusting means 115 with the tongs 124 is mounted by means of a plate-like support 126 on the mirror holder 112. The tongs 124 have on each side of the longitudinal line of symmetry a leg 127 and 128 respectively on the one side of the axis 125 and a tongs arm 129 and 130 integral therewith on the opposite side of the common axis 125. Both tongs legs 127 and 128 engage the arm 120 as if it were to be cut therebetween. A pivoting of the tongs arm 129 or 130 results at the tongs leg 127 or 128 in a deflection of the arm 120 about the vertical axis 117 and/or horizontal axis 118. If the tongs arm 129 is held in the position shown in FIG. 4 and only the arm 130 is pivoted in the direction of the arrow 131, the arm is displaced along the stationary tongs legs 127 upwardly and the mirror plate 111 pivoted about the axis 118, i.e. tilted downwardly. If the other tongs arm 130 is held fixed and the tongs arm 129 is pivoted in the direction of the arrow 132, the mirror plate 111 is pivoted inwardly in a lateral direction about the axis 117. The arm 120 is engaged by either the leg 128 or the leg 127 and slides along the fixedly held leg 127 or 128. The adjusting forces indicated by the arrows 131, 132 are directed away from each other so that an opening of the tongs arms 129, 130 results in a closing of the tongs legs 127, 128.

Figure 3:
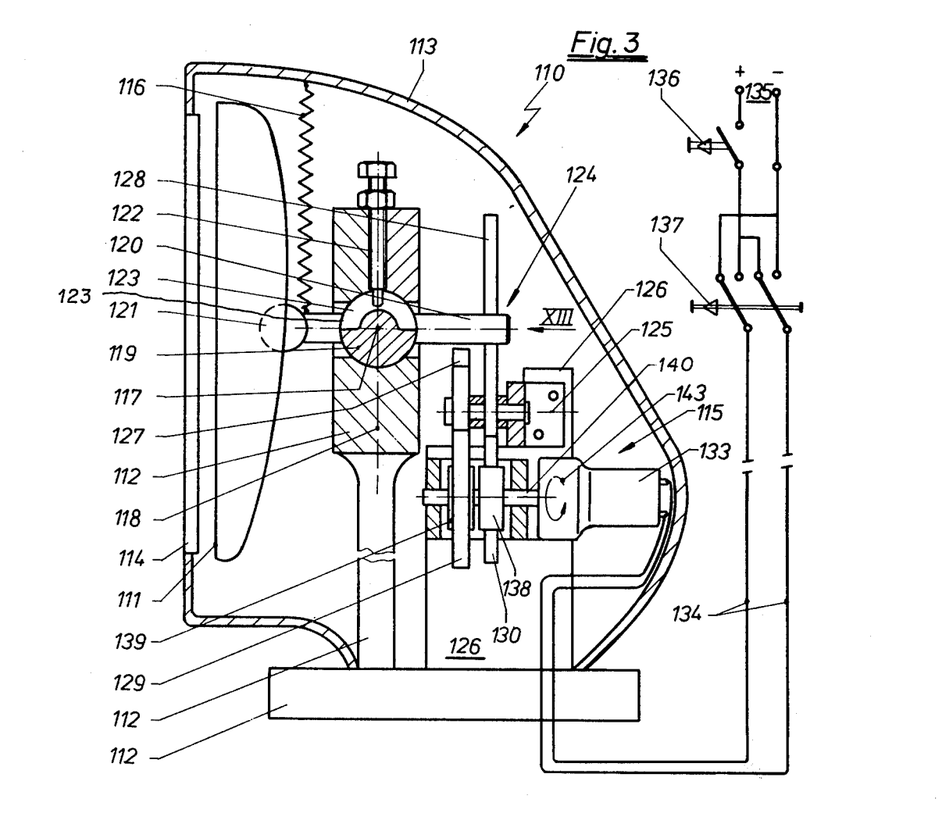
FIG. 3 is a horizontally sectioned plan view of a mirror according to one embodiment of the invention.
Figure 4:
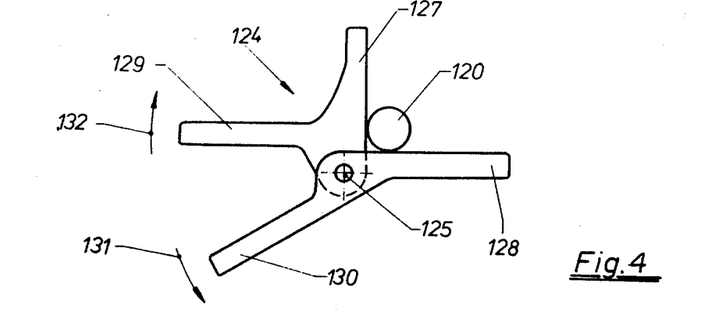
FIG. 4 is an end elevation of the adjusting element in the direction of the arrow XIII of FIG. 3.

The adjusting means 115 further comprises a single electrical reversible direct-current gear motor 133 which operatively engages the tongs arms 129 and 130 and is supplied from the vehicle electrical system 135 via a supply and control line 134 led out through the mirror holder 112. A switch 136 serves for switching on and switching off the motor 133 and a reversal switch 137 for reversing its direction of rotation.

The gear motor 133 acts via eccentric cams, via a first cam disc 138 on the tongs arm 130, and a second cam disc 139 on the tongs arm 129. The two cam discs 138, 139 are held between the arms 129, 130 and coaxially on the driven shaft 140 of the gear motor 133. Each cam disc 138, 139 is in bearing contact with the narrow face of the associated tongs arm 130 or 129 respectively, which faces the opposite tongs arm. The return spring 116 acts in the direction of the axes 117, 118 and presses the arm 120 against the tongs legs 127, 128 and thus, the tongs arms 129, 130 against the associated cam disc 139 or 138. The cam discs 138, 139 are so formed that the cam track 142 of the second cam disc 139 increases substantially continuously in the radial direction up to the eccentricity maximum in the direction of the first output direction of rotation according to the arrow 143 in FIG. 5 and the cam track 141 of the first cam disc 138 increases in the opposite second output direction of rotation (dashed line arrow 144) of the output shaft 140. A drive movement of the first cam disc 138 in the first drive direction (arrow 143) effects a pivoting of the tongs arm 130 in the direction of the arrow 131. A rotation of the second cam disc 139 in the second opposite output direction of rotation (arrow 144) effects a pivoting of the tongs arm 129 in the direction of the arrow 132.

The rotary movement of the cam discs 138 and 139, which are driven by oppositely installed free-wheels 145 and 146 clamping on the output shaft 140, is effected by changing the direction of rotation of the gear motor 133 which is coupled to the output shaft 140. The first free-wheel 145 is on the right in FIG. 5 and the second 146 on the left.

Figures 5, 6A, 6B:
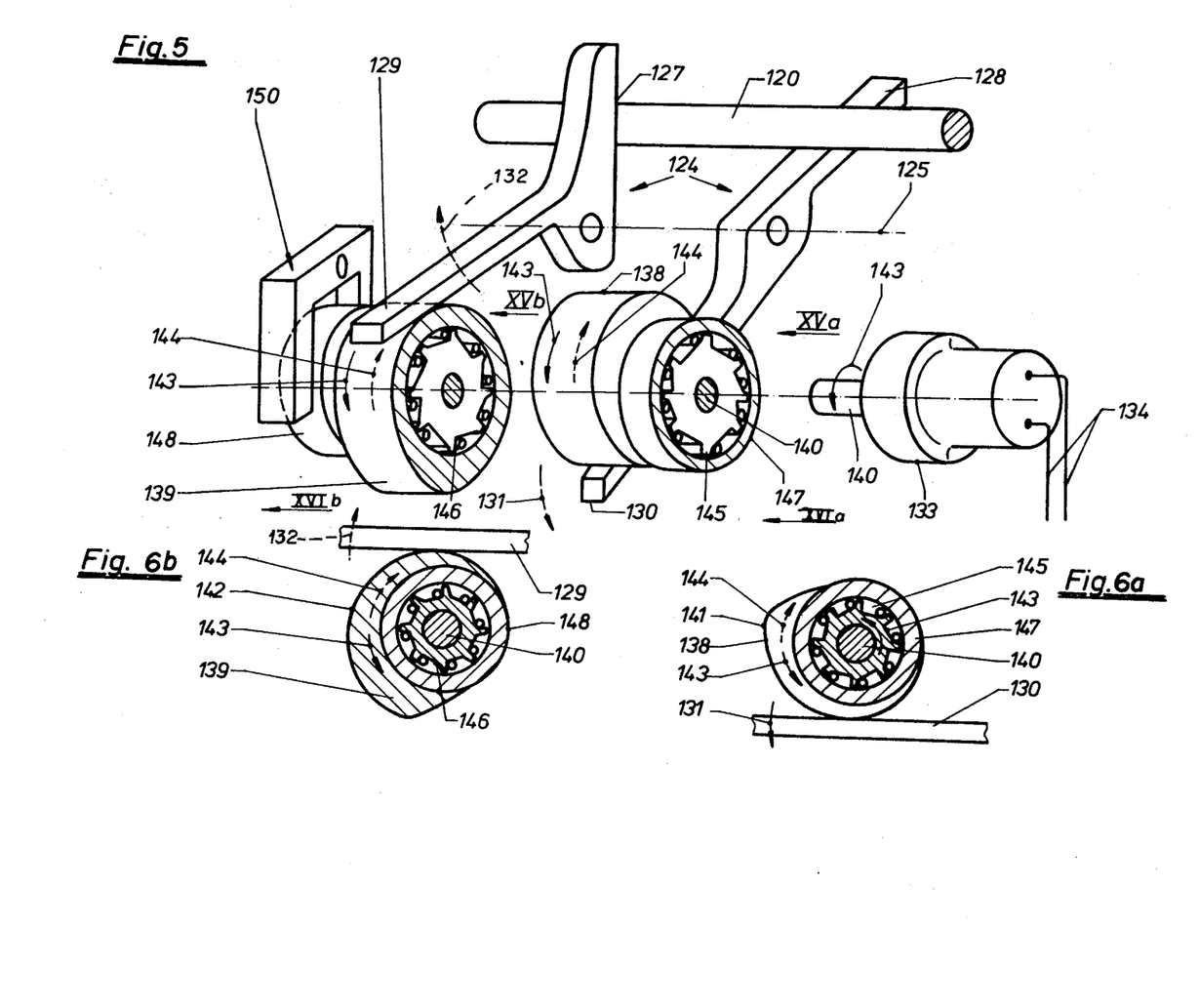

When the motor 133 is switched for the direction of rotation according to the arrow 143 the first cam disc 138 is coupled for torque transmission via its free-wheel 145 to the output shaft 140, whereas the second cam disc 139 runs freely in the same direction of rotation via its associated free-wheel 146 but is not coupled for torque-transmission with the output shaft 140. This free entrained rotation in the direction of the arrow 143 can lead unintentionally to the pivoting of the tongs arm 129 associated with the second cam disc 139 although this is not desired. If the output direction of rotation of the motor 133 is reversed (arrow 144) the conditions are the converse. The cam disc 138 is then freely entrained although it is not in torque-transmitting connection with the output shaft 140. This unintentionally adjusts the tongs arm 130. This unintentional movement due to free entrained rotation must be prevented. For this purpose the cam discs 138, 139 each have a non-positively acting return stop. The first cam disc 138 is blockable by means of its stop disc 147 against a return stop (not shown) against a rotary movement in the direction of the arrow 144 oppositely to the first torque-transmitting output direction of rotation according to the arrow 143. The second cam disc 139 is blockable by means of its stop disc 148 against an associated return stop 150 against a rotary movement in the same direction as the first output direction of rotation according to the arrow 143. The return stops may take the form of roller free-wheels or the like or alternatively sprung friction pins (FIG. 8) or friction discs.

In the embodiment 7 (FIG. 7) the mirror plate 111 is secured to a substantially plate-like support 171 which is pivotally moveable in a fork 172 between two tips 173, 174 about the axis 117.

Figure 7:
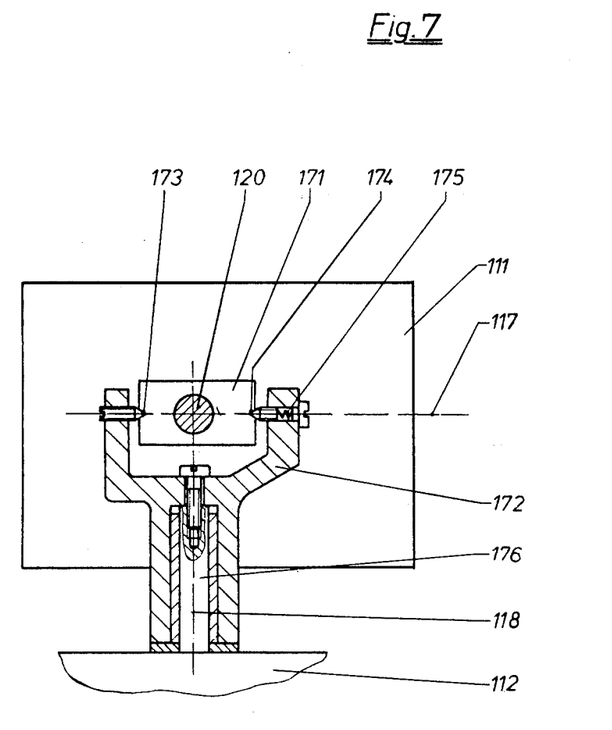
FIG. 7 is a schematic partially sectioned rear view of a mirror according to another embodiment.

The fork 172 is pivotally moveable in with respect to the mirror holder 112 about the axis 118 via a pin 176 engaging in the fork. The arm 120 is secured to the support 171 on the side remote from the mirror plate 111. The adjusting means 115 described engages the arm 120.

Figure 8:
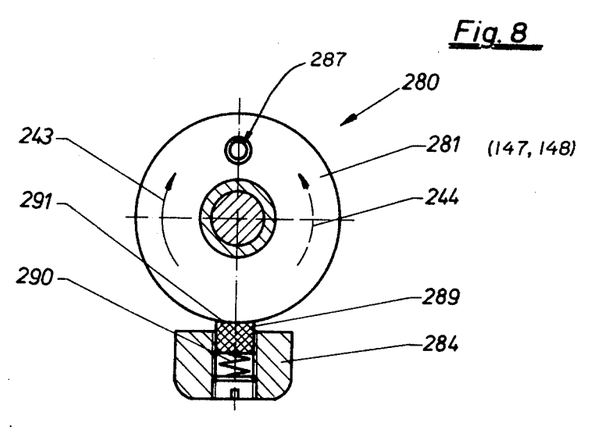
FIG. 8 is an axial partionally sectioned end elevation of a return stop.

In FIG. 8 an embodiment of a return stop 280 is shown which can be provided for each cam disc 138, 139. A return stop 280 is in the form of a friction brake with a stationary friction element 289 which is mounted for radial displacement in a stationary holder 284 and is pressed by means of a spring 290 adjustably arranged in the holder 284 and effective in the radial direction with its friction face 291 permanently on a peripheral portion of the stop disc 281. In another embodiment, which is not illustrated, the friction element 289 is not pressed against the stop disc 281 but against a peripheral portion of the cam disc (138, 139) itself or of the shaft section non-rotatably secured thereto. In another embodiment a brake disc which presses on the end face of the cam is used instead of a brake block as friction element.

We claim:

1. A setting and adjusting device for rearview mirrors adapted to be mounted on a vehicle body comprising
a mirror holder adapted to be mounted on the vehicle body,
a mirror plate having a front reflecting surface,
an arm defining a first axis, said arm being operatively connected to said mirror plate,
return spring means for biasing said arm,
means for mounting said arm pivotally relative to said mirror holder both about a substantially vertical axis and about a substantially horizontal axis as well as non-rotatably about said first axis, said first axis being perpendicular to said horizontal axis and said vertical axis,
means for adjusting said arm comprising,
two cooperative tongs-like members each independently pivotally mounted operatively to said mirror holder about a common axis, said members each have a first leg and a second leg, said first legs of said members abutting said arm guidably therebetween,
at least one controllable adjusting drive means for pivoting said second legs respectively of said members about said common axis causing a pivotal movement of said first legs respectively about said common axis in turn causing a displacement of said arm relative to and between said first legs, whereby said arm and said mirror plate pivot about said horizontal and said vertical axes, respectively.

2. The device as set forth in claim 1, wherein said at least one adjusting drive means includes eccentric cams, said eccentric cams engage said second legs of said members, respectively, and a driven shaft is operatively connected to said eccentric cams.

3. The device accoring to claim 2, wherein
said eccentric cams are cam discs,
said second legs of said tongs-like members have narrow faces, said cam discs contact said narrow faces, respectively.

4. The device as set forth in claim 3, wherein
said narrow faces respectively of each of said second legs face each other, whereby said cam discs are disposed inside a region included by said second legs.

5. The device as set forth in claim 3, wherein
said narrow faces respectively of each of said second legs face away from each other, whereby said cam discs are disposed outside a region included by said second legs.

6. The device according to claim 5, wherein
said at least one adjusting drive means includes an electrical gear motor, said driven shaft is an output shaft of said gear motor.

7. The device according to claim 5, wherein p1 said at least one adjusting drive means includes one reversible gear motor.

8. The device according to claim 6, further comprising
a mirror housing mounted on said holder, said means for mounting said arm is a portion of said mirror holder,
said portion, said return spring means, said tongs-like members, said gear motor and said eccentric cams are disposed within said mirror housing.

9. The device as set forth in claim 2, wherein
said at least one adjusting drive means comprises separate electrical gear motor means for driving each of said eccentric cams, respectively.

10. The device according to claim 2, wherein
said at least one adjusting drive means includes a single common gear motor for operatively driving both of said second legs,
said driven shaft is an output shaft of said common gear motor, said output shaft operatively acts on each of said eccentric cams,
said eccentric cams are cam discs arranged coaxially relative to each other operatively on said output shaft of said common gear motor within a region included between said second legs of said tongs-like members.

11. The device as set forth in claim 10, wherein
said cam discs comprise a first cam disc and a second cam disc, said first cam disc has a first cam track, said second cam disc has a second cam track, said second cam track in a first output direction of rotation of said output shaft and said first cam track in a second output direction of rotation of said output shaft increase redially substantially continuously up to an eccentricity maximum of said cam discs, respectively, said second output direction of rotation being opposite to said first output direction of rotation.

12. The device according to claim 11, further comprising
free-wheels comprising a first free-wheel and a second free-wheel are each mounted rotatably in one direction of rotation and jointly in the other direction of rotation, relative to said first and second cam discs, respectively, said free-wheels are jointly rotatably connected to said output shaft of said common gear motor,
said free-wheels constitute means for transmitting a torque by said first free-wheel to said first cam disc in said first output direction of rotation of said output shaft and in the opposite said second output direction of rotation said first free-wheel rotates substantially freely relative to said first cam disc, and for transmitting a torque by said second free-wheel to said second cam disc in the opposite second output direction of rotation of the output shaft and in said first output direction of rotation said second free-wheel rotates substantially freely relative to said second cam disc.

13. The device according to claim 12, wherein
said free-wheels are constructionally alike and disposed in opposite operative arrangement relative to said cam discs, respectively, on the output shaft.

14. The device as set forth in claim 13, wherein
said free-wheels are spring free-wheels.

15. The device according to claim 13, wherein
said free-wheels are roller free-wheels.

16. The device according to claim 12, further comprising
return stop means for blocking each of said cam discs against a freely entrained rotation in a same direction as an operative torque transmitting direction of rotation of the other of said cam discs, respectively.

17. The device as set forth in claim 16, wherein
said return stop means comprises a first return stop means and a second return stop means,
said first return means for blocking said first cam disc against a rotary movement in said second output direction of rotation, and
said second return stop means for blocking said second cam disc against a rotary movement in said first output direction of rotation.

18. The device as set forth in claim 1, wherein
said mounting means includes,
a ball pivotally mounted on said mirror holder about said vertical and horizontal axes, said arm is connected to said ball.

19. The device according to claim 18, wherein
said mounting means further comprises,
an arresting pin mounted on said holder,
said ball is formed with a narrow guide groove extending parallel to said first axis, said arresting pin extends into said narrow guide groove.

20. The device as set forth in claim 1, wherein
said mounting means comprises,
a support fixed to said mirror plate,
said arm is secured to said support,
a fork is pivotally mounted on said mirror holder and said support is pivotally mounted to said fork about mutually perpendicular axes constituting said vertical and horizontal axes.

21. The device as set forth in claims 18 or 20, wherein
said tongs-like members engage said arm on a side of said arm remote from said mounting means.

22. The device according to claim 17, wherein
each of said first and second return stop means comprises,
a blocking disc axially adjacent a corresponding of said cam discs, coaxial therewith, and centered on said output shaft and freely rotatably mounted,
at least one blocking roller engages a periphery of said blocking disc, a roller having an inclined face, said inclined face is stationary with respect to said output shaft, said at least one blocking roller is disposed in said roller holder against said inclined face, driver means for positively coupling said blocking disc to said cam disc.

23. The device as set forth in claim 22, wherein said inclined face of said roller holder extends substantially vertically, said blocking roller being pressed by gravity in a direction of a vertically tapering gap formed between said inclined face and the periphery of the blocking roller.

24. The device as set forth in claim 22, further comprising spring means for pressing said blocking roller into a clamping gap formed between said inclined face and the periphery of said blocking roller.

25. The device according to claim 22 wherein said driver means is an axial projection on said blocking disc, said cam disc is formed on an axial side thereof facing said blocking roller with a recess, said axial projection engages in said recess.

26. The device as set forth in claim 25, wherein said recess is a radial slot.

27. The device according to claim 17, wherein each of said first and second return stop means comprises blocking discs axially formed on portions of said cam discs, respectively, and coaxial therewith, said return stop means is a friction brake, including friction elements mounted stationarily with respect to said cam discs respectively, spring means for pressing said friction elements in a radial direction of said cam discs continuously against a peripheral face of the blocking discs, respectively.

28. The device as set forth in claim 16, wherein said return stop means is a friction brake, including friction elements mounted stationarily with respect to said cam discs, respectively, spring means for pressing said friction elements in a radial direction of said cam discs continuously against a peripheral face of the cam discs, respectively.

29. Setting or adjusting means for rearview mirrors according to claim 17, wherein each of said first and second return stop means comprises, a blocking disc axially adjacent a corresponding of said cam discs, coaxial therewith, and centered on said output shaft and freely rotatably mounted, driver means for positively coupling said blocking disc to said cam disc, said driver means is an axial projection on said blocking disc, said cam disc is formed on an axial side thereof facing said blocking disc with a recess, said axial projection engages in said recess, said return stop means is a friction brake, and preferably comprises for at each cam disc including friction elements, mounted stationarily with respect to said cam disc respectively, spring means for pressing said friction elements in a radial direction of said cam discs continuously against a peripheral face of the cam discs, respectively.

* * * * *

UNITED STATES PATENT AND TRADEMARK OFFICE
CERTIFICATE OF CORRECTION

PATENT NO. : 4,264,142
DATED : April 28, 1981
INVENTOR(S) : Erich Wunsch et al

It is certified that error appears in the above-identified patent and that said Letters Patent are hereby corrected as shown below:

Column 7  Line 23 delete "pl"

Line 19 "claim 5" should read --claim 2--

Signed and Sealed this

Eighth Day of February 1983

[SEAL]

Attest:

GERALD J. MOSSINGHOFF

Attesting Officer    Commissioner of Patents and Trademarks